(12) United States Patent
Tang

(10) Patent No.: US 11,728,876 B2
(45) Date of Patent: *Aug. 15, 2023

(54) SIGNAL TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/549,526

(22) Filed: Dec. 13, 2021

(65) Prior Publication Data

US 2022/0103230 A1 Mar. 31, 2022

Related U.S. Application Data

(63) Continuation of application No. 16/463,684, filed as application No. PCT/CN2016/109688 on Dec. 13, 2016, now Pat. No. 11,228,358.

(51) Int. Cl.
*H04B 7/06* (2006.01)

(52) U.S. Cl.
CPC .................. *H04B 7/0695* (2013.01)

(58) Field of Classification Search
CPC ...... H04B 7/0695; H04B 7/04; H04B 7/0408; H04B 7/0617; H04B 7/0626; H04W 72/042; H04W 72/1289; H04W 72/23
See application file for complete search history.

(56) References Cited

U.S. PATENT DOCUMENTS

| 10,498,408 B2 | 12/2019 | Yu et al. |
| 10,834,728 B2 | 11/2020 | Li et al. |
| | (Continued) | |

FOREIGN PATENT DOCUMENTS

| CN | 101064558 A | 10/2007 |
| CN | 102474326 A | 5/2012 |
| | (Continued) | |

OTHER PUBLICATIONS

Supplementary European Search Report in the European application No. 16923649.4, dated Oct. 22, 2019.

(Continued)

*Primary Examiner* — Kenneth T Lam
(74) *Attorney, Agent, or Firm* — . Ladas & Parry LLP

(57) ABSTRACT

Disclosed are a signal transmission method, a terminal device and a network device. The method comprises: receiving beam indication information sent by a network device, wherein the beam indication information is used to indicate whether beams for transmitting N signals are the same, and N is an integer greater than 1; and according to the beam indication information, transmitting the N signals with the network device. By means of the method, the terminal device and the network device in the embodiments of the present invention, signal transmission is carried out depending on whether a plurality of signals are transmitted using the same beam, determined according to beam indication information, so that the terminal device and the network device can determine respective optimal beams for transmitting or receiving signal, thereby improving the performance of subsequent signal detection.

10 Claims, 3 Drawing Sheets

100 — Beam indication information sent by a network device is received, the beam indication information being configured to indicate whether the same beam is adopted for transmission of N signals and N being an integer greater than 1 — S110

Transmission of the N signals is performed with the network device according to the beam indication information — S120

(56) References Cited

U.S. PATENT DOCUMENTS

| | | | |
|---|---|---|---|
| 11,228,358 B2* | 1/2022 | Tang | H04B 7/0695 |
| 2009/0215401 A1 | 8/2009 | Yoon | |
| 2010/0173639 A1 | 7/2010 | Li | |
| 2011/0110453 A1 | 5/2011 | Prasad | |
| 2013/0286960 A1 | 10/2013 | Li et al. | |
| 2014/0010178 A1 | 1/2014 | Yu et al. | |
| 2014/0177561 A1 | 6/2014 | Yu et al. | |
| 2014/0177607 A1 | 6/2014 | Li et al. | |
| 2016/0134352 A1 | 5/2016 | Stirling-Gallacher | |
| 2016/0150435 A1 | 5/2016 | Baek et al. | |
| 2016/0338064 A1 | 11/2016 | Kuo | |
| 2016/0373180 A1 | 12/2016 | Guo et al. | |
| 2017/0311301 A1 | 10/2017 | Yu et al. | |
| 2018/0070343 A1 | 3/2018 | Chen et al. | |
| 2018/0083680 A1 | 3/2018 | Guo et al. | |
| 2018/0115355 A1 | 4/2018 | Nagata et al. | |
| 2018/0159600 A1* | 6/2018 | Kim | H04B 7/088 |
| 2019/0199413 A1 | 6/2019 | Sundararajan | |
| 2019/0208428 A1 | 7/2019 | Tang et al. | |
| 2019/0268114 A1 | 8/2019 | Kang et al. | |
| 2019/0357274 A1* | 11/2019 | Lee | H04W 16/28 |
| 2022/0271817 A1* | 8/2022 | Lee | H04B 17/382 |
| 2022/0271890 A1* | 8/2022 | Grossmann | H04W 52/242 |

FOREIGN PATENT DOCUMENTS

| | | |
|---|---|---|
| CN | 103716081 A | 4/2014 |
| CN | 103828255 A | 5/2014 |
| CN | 103918196 A | 7/2014 |
| CN | 104104467 A | 10/2014 |
| CN | 104718712 A | 6/2015 |
| CN | 104885377 A | 9/2015 |
| CN | 105122662 A | 12/2015 |
| CN | 105556869 A | 5/2016 |
| CN | 105684321 A | 6/2016 |
| CN | 105743824 A | 7/2016 |
| CN | 106170930 A | 11/2016 |
| CN | 106374984 A | 2/2017 |
| CN | 107534467 A | 1/2018 |
| EP | 2936702 A1 | 10/2015 |
| EP | 3282596 A1 | 2/2018 |
| EP | 3461180 A1 | 3/2019 |
| JP | 2015185952 A | 10/2015 |
| JP | 2016514406 A | 5/2016 |
| RU | 2014153522 A | 7/2016 |
| WO | 2014098542 A1 | 6/2014 |
| WO | 2018058464 A1 | 4/2016 |
| WO | 2016163542 A1 | 10/2016 |

OTHER PUBLICATIONS

English translation of the Written Opinion of the International Search Authority in the international application No. PCT/CN2016/109688, dated Sep. 4, 2017.
First Office Action of the Mexican application No. MX/a/2019/006885, dated Jun. 23, 2022.
Notice of Allowance of the Chinese application No. 201680091393.9, dated Nov. 6, 2020.
Second Office Action of the European application No. 16923649.4, dated Dec. 1, 2020.
Intel Corporation, UL Beam Management [online], 3GPP TSG-RAN WG1#86b R1-1609517, Internet<URL:http://www.3gpp.org/ftp/tsg_ran/WG1_RL1/TSGR1_86b/Docs/R1-1609517.zip>, Oct. 14, 2016.
LG Electronics, Discussion on QCL assumptions for NR [oNline], 3GPP TSG RAN WG1 #87 R1-1611806, Internet<URL:http://www.3gpp.org/ftp/tsg_ran/WG1_RL1/TSGR1_87/Docs/R1-1611806.zip>, Nov. 18, 2016.
First Office Action of the Japanese application No. 2019-552319, dated Nov. 27, 2020.
Third Office Action of the European application No. 16923649.4, dated May 4, 2021.
First Office Action of the Indonesian application No. P00201905917, dated Jun. 15, 2021.
Decision of Refusal of the Japanese application No. 2019-552319, dated Jul. 20, 2021.
First Office Action of the Taiwanese application No. 106141707, dated May 10, 2021.
First Office Action of the Chinese application No. 202011480022.4, dated Jul. 28, 2021.
First Office Action of the Chinese application No. 201680091393.9, dated May 6, 2020.
First Office Action of the European application No. 16923649.4, dated Jul. 3, 2020.
First Office Action of the Chilean application No. 201901581, dated Feb. 19, 2020.
First Office Action of the Canadian application No. 3046396, dated Jul. 2, 2020.
Huawei, HiSilicon, Discussion on beam management aspects for DL MIMO, 3GPP TSG RAN WG1 Meeting #87 R1-1611670, Nov. 14-18, 2016.
Reconsideration Report of the Japanese application No. 2019-552319, dated Jan. 21, 2022.
Second Office Action of the Chinese application No. 202011480022.4, dated Feb. 8, 2022.
First Office Action of the Israeli application No. 267182, dated Feb. 14, 2022.
Second Written Opinion of the Singaporean application No. 11201905230Y, dated Mar. 23, 2022.
First Office Action of the Malaysian application No. PI2019003364, dated Apr. 14. 2022.
First Office Action of the Russian application No. 2019122102, dated Jan. 10, 2020.
First Office Action of the Australian application No. 2016432415, dated Aug. 26, 2021.
Fourth Office Action of the European application No. 16923649.4, dated Oct. 28, 2021.
Qualcomm; "Beam management for NR", 3GPP TSG RAN1 86b,R1-1612056. Reno, NV, Nov. 14-18, 2016.
Ericsson; "Beam management overview", 3GPP TSG-RAN WG1 #87, R1-1612345, Reno, Nevada, Nov. 14-18, 2016.
Office Action of the Indian application No. 201917021695, dated Sep. 21, 2020.
First Office Action of the Brazilian application No. BR1120190118136, dated Sep. 15, 2020.
Written Opinion of the Singaporean application No. 11201905230Y, dated Aug. 20, 2020.
International Search Report in international application No. PCT/CN2016/109688, dated Sep. 4, 2017.
Written Opinion of the International Search Authority in international application No. PCT/CN2016/109688, dated Sep. 4, 2017.
First Office Action of the U.S. Appl. No. 16/463,684, dated Feb. 10, 2021.
Final Office Action of the U.S. Appl. No. 16/463,684, dated Jun. 8, 2021.
Notice of Allowance of the U.S. Appl. No. 16/463,684, dated Sep. 8, 2021.
Corrected Notice of Allowance of the U.S. Appl. No. 16/463,684, dated Dec. 3, 2021.
Second Office Action of the Chinese application No. 201680091393.9, dated Aug. 10, 2020.
First Office Action of the Vietnamese application No. 1-2019-03637, dated Nov. 24, 2022.

* cited by examiner

200 — Beam indication information is sent to a terminal device, the beam indication information being configured to indicate whether the same beam is adopted for transmission of the N signals and N being an integer greater than 1 — S210
Transmission of the N signals is performed with the terminal device — S220
FIG. 4
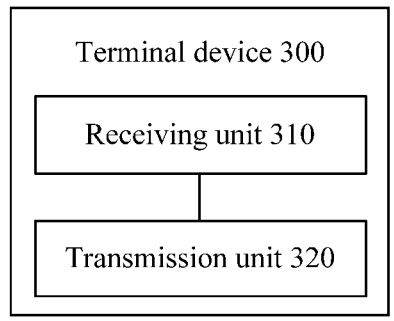
FIG. 5
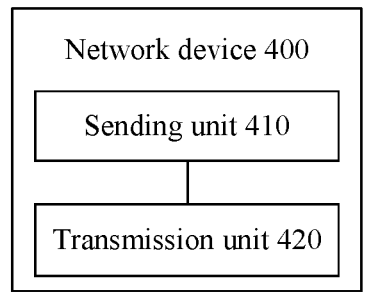
FIG. 6

1

SIGNAL TRANSMISSION METHOD, TERMINAL DEVICE AND NETWORK DEVICE

RELATED APPLICATION

This application is a continuation of application Ser. No. 16/463,684 filed on May 23, 2019, which is an application under 35 U.S.C. 371 of International Application No. PCT/CN2016/109688 filed on Dec. 13, 2016, the entire contents of each of which are incorporated herein by reference.

TECHNICAL FIELD

The disclosure relates to the field of communications, and more particularly to a signal transmission method, a terminal device and a network device.

BACKGROUND

In researches on a 5th-Generation (5G) mobile communication technology, a Beamforming (BF) technology is an important technology for improving coverage and spectrum efficiency. BF refers to an antenna array-based signal preprocessing technology of adjusting weights of sending signals on each antenna array element to generate a directional beam.

During uplink signal transmission, a terminal device may adopt different beams or the same beam to send multiple signals. Similarly, during downlink signal transmission, the terminal device may also adopt different beams or the same beam to receive multiple signals. For improving performance of subsequent signal transmission, there is an urgent need for a novel signal transmission method.

SUMMARY

In view of this, embodiments of the disclosure provide a signal transmission method, a terminal device and a network device, which may improve the performance of subsequent signal transmission.

A first aspect provides a signal transmission method, which may include the following operations. Beam indication information sent by a network device is received, the beam indication information being configured to indicate whether the same beam is adopted for N signals to be sent or received and N being an integer greater than 1. Transmission of the N signals is performed with the network device according to the beam indication information.

It is determined whether the same beam is adopted for transmission of the N signals according to the beam indication information and signal transmission is performed based on the determination, so that a terminal device and the network device may determine respective optimal beams adopted for signal sending or signal receiving. Therefore, performance of subsequent signal detection is improved.

In a possible implementation mode, the beam indication information may be configured for indicating that the network device will send the N signals to a terminal device using different beams. The operation that transmission of the N signals is performed with the network device according to the beam indication information may include that: the N signals are received according to the beam indication information. The method may further include the following operation. First indication information is sent to the network device, and the first indication information is configured to indicate K signals out of the N signals, $1 \leq K \leq N$ and K being an integer.

Specifically, the terminal device may adopt the same beam to receive the N signals according to the beam indication information, so that the terminal device may determine a signal with optimal quality in the N signals sent by the network device according to quality of the N received signals.

In at least one embodiment, the first indication information may be signal indexes of the K signals, and there is a correspondence between the signals and the beams. The K signals may be one or multiple signals with the optimal receiving quality in the N signals received by the terminal device.

In a possible implementation mode, the beam indication information may be configured to indicate the terminal device to send the N signals to the network device using different beams. The operation that transmission of the N signals is performed with the network device according to the beam indication information may include that: the N signals are sent according to the beam indication information. The method may further include the following operation. Second indication information sent by the network device is received, and the second indication information is configured to indicate L signals out of the N signals, $1 \leq L \leq N$ and L being an integer.

Furthermore, the terminal device, after adopting different beams to send the N signals, may determine a beam used for sending a subsequent signal according to the second indication information.

In at least one embodiment, the second indication information may be signal indexes of the L signals, and there is a correspondence between the signals and the beams. The L signals may be one or multiple signals with the optimal receiving quality in the N signals received by the network device.

In a possible implementation mode, the beam indication information may be configured to indicate that the network device will send the N signals to the terminal device using the same beam. The operation that transmission of the N signals is performed with the network device according to the beam indication information may include that: the N signals are received using different beams according to the beam indication information. The method may further include the following operation. A beam used for receiving a subsequent signal is determined from the beams for receiving the N signals.

In a possible implementation mode, the beam indication information may be configured to indicate the terminal device to send the N signals to the network device using the same beam. The operation that transmission of the N signals is performed with the network device according to the beam indication information may include the following action. The N signals are sent by using the same beam according to the beam indication information.

In a possible implementation mode, the N signals may be a same type of reference signals with different transmission resource configurations or a same type of channels with different transmission resource configurations.

In a possible implementation mode, the N signals may be signals activated or deactivated by a same Media Access Control (MAC) signaling, or the N signals may be reference signals triggered by a same Downlink Control Information (DCI) signaling, or the N signals may be channels scheduled by the same DCI signaling.

In a possible implementation mode, the beam indication information may be carried in at least one of the following signaling or signals: Radio Resource Control (RRC) signaling, MAC signaling, DCI signaling, a downlink synchronization signal, a downlink random access signal or a downlink pilot signal.

In at least one embodiment, the beam indication information may also be carried in a downlink control signal, for example, a Physical Broadcast Channel (PBCH).

In a possible implementation mode, the MAC signaling may be used to activate or deactivate the N signals; and/or, responsive to determining that the N signals are reference signals, the DCI signaling may be used to trigger the N signals, and responsive to determining that the N signals are channels, the DCI signaling may be used to schedule the N signals.

In a possible implementation mode, the RRC signaling may further be used to carry transmission resource configuration information corresponding to the N signals. The operation that transmission of the N signals is performed with the network device according to the beam indication information may include that: transmission of the N signals is performed with the network device according to the beam indication information and the transmission resource configuration information.

In a possible implementation mode, the beam indication information may include beam information in one-to-one correspondence with each signal in the N signals. The beam indication information may indicate whether the same beam is adopted for the N signals through at least one of the followings. Responsive to determining that contents indicated by the beam information for a first signal and a second signal in the N signals are the same, the same beam is adopted to transmit the first signal and the second signal; responsive to determining that contents indicated by the beam information for a third signal and a fourth signal in the N signals are different, different beams are adopted to transmit the third signal and the fourth signal; responsive to determining that the beam information for a fifth signal and a sixth signal in the N signals is a first preconfigured value, the same beam is adopted to transmit the fifth signal and the sixth signal; responsive to determining that the beam information for a seventh signal and an eighth signal in the N signals is a second preconfigured value, different beams are adopted to transmit the seventh signal and the eighth signal, the first value being different from the second value; responsive to determining that a content indicated by the beam information for a ninth signal in the N signals includes an index of a tenth signal in the N signals, the same beam is adopted to transmit the ninth signal and the tenth signal; or responsive to determining that a content indicated by the beam information for an eleventh signal in the N signals includes an index of a twelfth signal in the N signals, different beams are adopted to transmit the eleventh signal and the twelfth signal.

In a possible implementation mode, the N signals may be at least one type of the following signals: Channel State Information-Reference Signals (CSI-RSs), Sounding Reference Signals (SRSs), Physical Random Access Channels (PRACHs), synchronization signals, PBCHs, Demodulation Reference Signals (DMRSs) or Beam-specific Reference Signal (BRSs).

A second aspect provides a signal transmission method, which may include the following operations. Beam indication information is sent to a terminal device, the beam indication information being configured to indicate whether the same beam is adopted for N signals to be sent or received and N being an integer greater than 1. Transmission of the N signals is performed with the terminal device.

A network device sends the beam indication information used for determining whether the same beam is adopted for transmission of the multiple signals to the terminal device, so that the terminal device and the network device may determine respective optimal beams adopted for signal sending or signal receiving. Therefore, performance of subsequent signal detection is improved.

In a possible implementation mode, the beam indication information may be configured for indicating that a network device will send the N signals to the terminal device using different beams. The operation that transmission of the N signals is performed with the terminal device may include that: the N signals are sent using different beams. The method may further include the following operation. First indication information sent by the terminal device is received, and the first indication information is configured to indicate the beams used for K signals out of the N signals, $1 \leq K \leq N$ and K being an integer.

Furthermore, the network device, after adopting different beams to send the N signals, may determine a beam used for sending a subsequent signal according to the first indication information.

In a possible implementation mode, the beam indication information may be configured to indicate the terminal device to send the N signals to the network device using different beams. The operation that transmission of the N signals is performed with the terminal device may include that: the N signals are received using the same beam. The method may further include the following operation. Second indication information is sent to the terminal device, and the second indication information is configured to indicate the beams used for L signals out of the N signals, $1 \leq L \leq N$ and L being an integer.

In a possible implementation mode, the beam indication information may be configured to indicate that the network device will send the N signals to the terminal device using the same beam. The operation that transmission of the N signals is performed with the terminal device may include the following action. The N signals are sent using the same beam.

In a possible implementation mode, the beam indication information may be configured to indicate the terminal device to send the N signals to the network device using the same beam. The operation that transmission of the N signals is performed with the terminal device may include that: the N signals are received using different beams. The method may further include the following operation. A beam used for receiving a subsequent signal is determined from the beams for receiving the N signals.

In a possible implementation mode, the N signals may be a same type of reference signals with different transmission resource configurations or a same type of channels with different transmission resource configurations.

In a possible implementation mode, the N signals may be signals activated or deactivated by a same MAC signaling, or the N signals may be reference signals triggered by a same DCI signaling, or the N signals may be channels scheduled by the same DCI signaling.

In a possible implementation mode, the beam indication information may be carried in at least one of the following signaling or signals: RRC signaling, MAC signaling, DCI signaling, a downlink synchronization signal, a downlink random access signal or a downlink pilot signal.

In a possible implementation mode, the MAC signaling may be used to activate or deactivate the N signals; and/or, responsive to determining that the N signals are reference signals, the DCI signaling may be used to trigger the N signals, and responsive to determining that the N signals are channels, the DCI signaling may be used to schedule the N signals.

In a possible implementation mode, the RRC signaling may further be used to carry transmission resource configuration information corresponding to the N signals. The operation that transmission of the N signals is performed with the terminal device may include that: transmission of the N signals is performed with the terminal device according to the transmission resource configuration information.

In a possible implementation mode, the beam indication information may be beam information in one-to-one correspondence with each signal in the N signals. The beam indication information may indicate whether the same beam is adopted for the N signals through at least one of the followings. Responsive to determining that contents indicated by the beam information for a first signal and a second signal in the N signals are the same, the same beam is adopted to transmit the first signal and the second signal; responsive to determining that contents indicated by the beam information for a third signal and a fourth signal in the N signals are different, different beams are adopted to transmit the third signal and the fourth signal; responsive to determining that the beam information for a fifth signal and sixth signal in the N signals is a first preconfigured value, the same beam is adopted to transmit the fifth signal and the sixth signal; responsive to determining that the beam information for a seventh signal and an eighth signal in the N signals is a second preconfigured value, different beams are adopted to transmit the seventh signal and the eighth signal, the first value being different from the second value; responsive to determining that a content indicated by the beam information for a ninth signal in the N signals includes an index of a tenth signal in the N signals, the same beam is adopted to transmit the ninth signal and the tenth signal; or responsive to determining that a content indicated by the beam information for an eleventh signal in the N signals includes an index of a twelfth signal in the N signals, different beams are adopted to transmit the eleventh signal and the twelfth signal.

In a possible implementation mode, the N signals may be at least one type of the following signals: CSI-RSs, SRSs, PRACHs, downlink synchronization signals, PBCHs, DMRSs or BRSs.

A third aspect provides a terminal device, which is configured to execute the method in the first aspect or any possible implementation mode of the first aspect. Specifically, the terminal device includes units configured to execute the method in the first aspect or any possible implementation mode of the first aspect.

A fourth aspect provides a network device, which is configured to execute the method in the second aspect or any possible implementation mode of the second aspect. Specifically, the network device includes units configured to execute the method in the second aspect or any possible implementation mode of the second aspect.

A fifth aspect provides a terminal device, which includes a memory, a processor and a transceiver. The memory, the processor and the transceiver communicate with each other through an internal connecting path to transmit control and/or data signals. The memory is configured to store an instruction. The processor is configured to execute the instruction stored in the memory. When the instruction is executed, the processor controls the transceiver to receive input data information and output data such as an operation result.

A sixth aspect provides a network device, which includes a memory, a processor and a transceiver. The memory, the processor and the transceiver communicate with each other through an internal connecting path to transmit control and/or data signals. The memory is configured to store an instruction. The processor is configured to execute the instruction stored in the memory. When the instruction is executed, the processor controls the transceiver to receive input data and information and output data such as an operation result.

BRIEF DESCRIPTION OF DRAWINGS

FIG. 4 is another schematic block diagram of a signal transmission method according to an embodiment of the disclosure.

FIG. 5 is a schematic block diagram of a terminal device for signal transmission according to an embodiment of the disclosure.

FIG. 6 is a schematic block diagram of a network device for signal transmission according to an embodiment of the disclosure.

DETAILED DESCRIPTION

Figure 1:
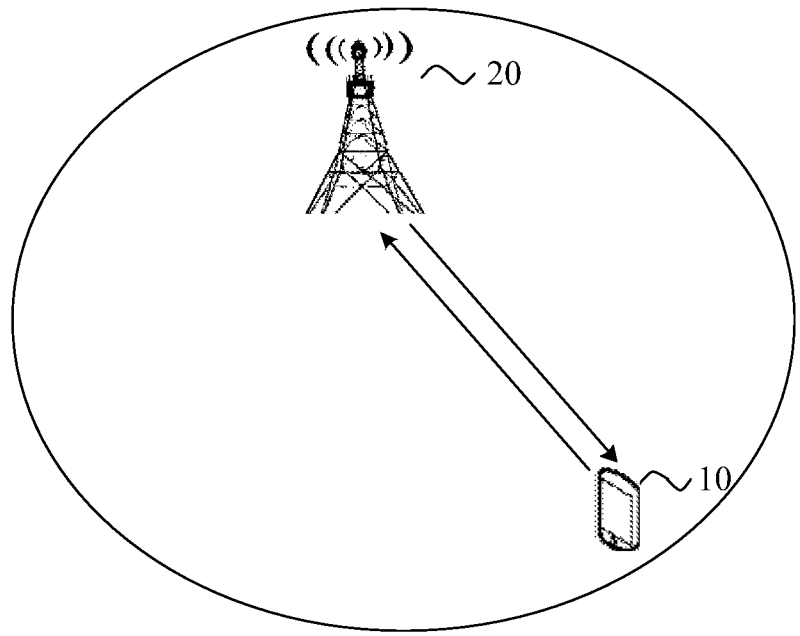
FIG. 1 is a schematic diagram of a possible application scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a future 5G system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems using nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems using the nonorthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a future 5G network, a terminal device in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Alternatively, the network device may be a relay station, an access point, a vehicle-mounted device, a wearable device, a network device in the future 5G network, a network device in the future evolved PLMN or the like. There are no limits made in the embodiments of the disclosure.

FIG. 1 is a schematic diagram of an application scenario according to the disclosure. A communication system in FIG. 1 may include a terminal device 10 and a network device 20. The network device 20 is configured to provide communication service for the terminal device 10 and access to a core network. The terminal device 10 searches a synchronization signal, broadcast signal and the like sent by the network device 20 to access the network, thereby communicating with the network. Arrows illustrated in FIG. 1 may represent uplink/downlink transmission implemented through a cellular link between the terminal device 10 and the network device 20.

In researches on 5G, a Beamforming (BF) technology is an important technology for improving coverage and spectrum efficiency. BF is an implementation manner for an intelligent adaptive array antenna as well as a digital signal processing technology implemented on an antenna array consisting of multiple array elements. With the BF technology, differences of a desired signal and an interference signal in spatial channel characteristics such as an angle of arrival are utilized, a proper weighted value is set for the antenna array and the desired signal and the interference signal are spatially isolated, so as to reduce interference between users and improve a system capacity.

Figure 2:
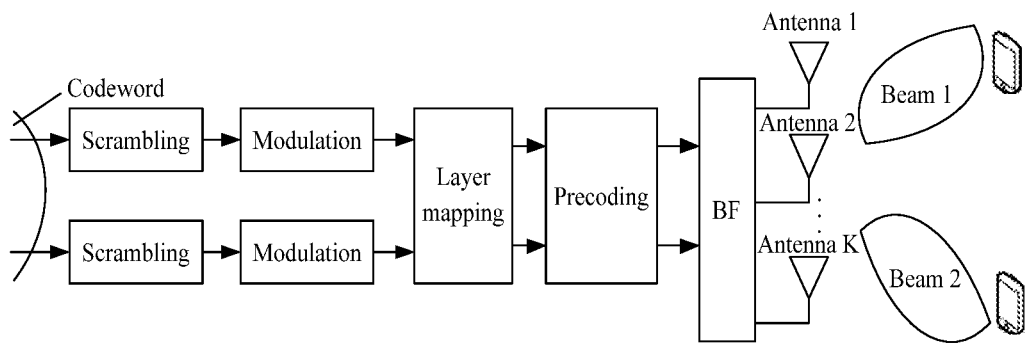
FIG. 2 is a schematic block diagram of dual-stream BF.

In order to conveniently understand the embodiments of the disclosure, the BF technology will be simply introduced below with dual-stream BF in FIG. 2 as an example. As illustrated in FIG. 2, two data streams of a sender are scrambled and modulated respectively, then are subjected to antenna layer mapping and precoding processing and enter a BF unit. Two groups of beamforming coefficients are calculated for the two different data streams to beamform the two data streams respectively, and the beamformed data streams are sent to antenna ports and pointed to different users.

During uplink transmission, a terminal device may adopt different beams to send multiple signals and a network device indicates the beam with optimal receiving quality in the beams as a beam for subsequent uplink signal transmission. Meanwhile, the terminal device may also adopt the same beam to send multiple same signals, and the network device adopts different beams to receive the multiple signals, thereby selecting the beam with optimal receiving quality as a beam for subsequent signal receiving.

Similarly, during downlink transmission, the network device may adopt different beams to send multiple signals and the terminal device indicates the beam with the optimal receiving quality in the beams as a beam for subsequent downlink signal transmission. Meanwhile, the network device may also adopt the same beam to send multiple same signals, and the terminal device adopts different beams to receive the multiple signals, thereby selecting the beam with the optimal receiving quality as a beam for subsequent signal receiving.

Therefore, during both of uplink transmission and downlink transmission, a receiver is required to know whether the same beam or different beams are adopted for multiple signals sent by a sender, so as to determine a beam used for receiving or sending a subsequent signal.

Figure 3:
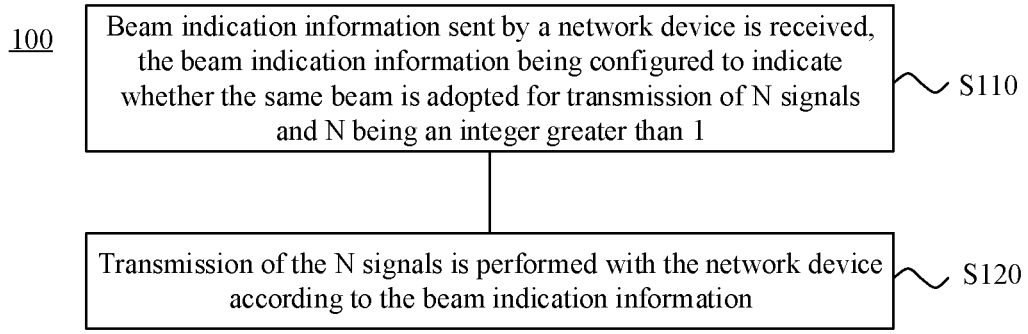
FIG. 3 is a schematic block diagram of a signal transmission method according to an embodiment of the disclosure.

FIG. 3 is a schematic block diagram of a signal transmission method 100 according to an embodiment of the disclosure. As illustrated in FIG. 3, the method may be executed by a terminal device and, for example, may be executed by UE. The method 100 includes the following operations.

In S110, beam indication information sent by a network device is received, the beam indication information being configured to indicate whether the same beam is adopted for transmission of N signals and N being an integer greater than 1.

In S120, transmission of the N signals is performed with the network device according to the beam indication information.

Specifically, the network device may predetermine whether beams for transmission of multiple signals by the terminal device or the network device are the same. The network device may further send the beam indication information to the terminal device through RRC signaling and the like and may notify the specific signals for which the same beam is adopted or specific signals for which different beams are adopted in the multiple signals to the terminal device through the beam indication information, and then the terminal device may determine how to send or receive the multiple signals according to the beam indication information. For example, the network device notifies the terminal device that, when multiple uplink signals are transmitted, the same beam may be adopted for two uplink signals therein, then the network device may adopt different beams to receive the two signals and the network device may further select an optimal beam adopted for subsequently receiving the uplink signals from the beams for receiving the two signals.

According to the signal transmission method of the embodiment of the disclosure, it is determined whether the same beam is adopted for transmission of the multiple signals according to the beam indication information and signal transmission is performed based on the determination, so that the terminal device and the network device may determine respective optimal beams adopted for signal sending or signal receiving. Therefore, performance of subsequent signal detection is improved.

Three points are to be noted. First, descriptions are made in the embodiment of the disclosure with the condition that the network device sends the beam indication information to the terminal device to notify the terminal device whether the same beam is adopted to transmit the multiple signals as an example. Similarly, the terminal device may also send beam indication information to the network device to notify the network device whether the same beam is adopted to transmit the multiple signals. Specifically, the beam indication information may be carried through some dedicated signaling. The disclosure is not limited thereto.

Second, the N signals may be uplink signals and may also be downlink signals. They may be synchronization signals, may be broadcast signals such as PBCHs and System Information Blocks (SIBs), may also be PRACHs and BRSs, and may further be downlink reference signals such as CSI-RSs, DMRSs and SRSs.

Third, transmission of the N signals with the network device refers to transmission and reception of the signals with the network device. The terminal device may receive the N signals sent by the network device, and the terminal device may also send the N signals to the network device.

In at least one embodiment of the disclosure, the beam indication information is configured to indicate that the network device would send the N signals to a terminal device using different beams. The operation that transmission of the N signals is performed with the network device according to the beam indication information includes that: the N signals are received according to the beam indication information. The method further includes the following operation. First indication information is sent to the network device, and the first indication information is configured to indicate K signals out of the N signals, $1 \leq K \leq N$ and K being an integer.

Those skilled in the art know that the BF technology may be divided into a codebook-based manner and a channel-reciprocity-based manner according to a channel information feedback manner. In the first manner, the network device determines a precoding codebook for next transmission based on codebook information fed back by a terminal. In the second manner, downlink channel information is obtained by use of channel reciprocity according to an SRS sent during uplink and a precoding matrix required by downlink is calculated and selected. For example, when the terminal device adopts N different beams to beamform the N signals and sends the N beamformed signals to the network device, the network device may usually adopt the same beam to receive the N signals and report one or more beam indexes or an index of a CSI-RS resource corresponding to the one or more beam indexes to the terminal device. The network device may also report one or more signal indexes and the like to the terminal device for the terminal device to perform BF on a subsequent signal. Specifically, the signal index reported by the network device may be an index of the signal with the optimal signal quality in the downlink signals that is sent by the terminal device with different beams, and may also be a signal index corresponding to the second optimal signal quality or another beam index. There are no limits made thereto in the disclosure.

In at least one embodiment of the disclosure, the beam indication information is configured to indicate the terminal device to send the N signals to the network device using different beams. The operation that transmission of the N signals is performed with the network device according to the beam indication information includes that: the N signals are sent according to the beam indication information. The method further includes the following operation. Second indication information sent by the network device is received, and the second indication information is configured to indicate L signals out of the N signals, $1 \leq L \leq N$ and L being an integer.

For example, when the network device adopts N different beams to beamform the N signals and sends the N beamformed signals to the terminal device, the terminal device may usually adopt the same beam to receive the N signals and report one or more beam indexes or an index of a CSI-RS resource corresponding to the one or more beam indexes to the network device. The terminal device may also report one or more signal indexes and the like to the network device for the network device to perform BF on a subsequent signal. Specifically, the signal index reported by the terminal device may be an index of the signal with the optimal signal quality in the downlink signals that is sent by the network device with different beams, and may also be a signal index corresponding to the second optimal signal quality or another beam index. There are no limits made thereto in the disclosure.

Furthermore, the terminal device, after sending the multiple signals by using different beams, may further determine a beam used for sending a subsequent signal according to the second indication information. Specifically, the terminal device determines a beam used for sending a signal indicated by the second indication information according to the received second indication information and determines the determined beam as the beam used for sending the subsequent signal.

In at least one embodiment of the disclosure, the beam indication information is configured to indicate that the network device would send the N signals to the terminal device using the same beam. The operation that transmission of the N signals is performed with the network device according to the beam indication information includes that: different beams are adopted to receive the N signals according to the beam indication information. The method further includes the following operation. A beam used for receiving a subsequent signal is determined from the beams for receiving the N signals.

Similarly, when the terminal device determines according to the beam indication information that the network device adopts the same beam to send the multiple signals to the terminal device, the network device may adopt different beams to receive the multiple beamformed signals and determine the beams adopted for the signal with the optimal receiving quality in the multiple signals, thereby determining the specific beams subsequently adopted to receive the signal with the optimal signal quality. It is to be understood that there may be one or more signals with the optimal receiving quality. There are no limits made thereto in the disclosure.

In at least one embodiment of the disclosure, the beam indication information is configured to indicate the terminal device to send the N signals to the network device using the same beam. The operation that transmission of the N signals is performed with the network device according to the beam indication information includes the following action. The N signals are sent by using the same beam according to the beam indication information.

Similarly, when the terminal device determines according to the beam indication information that the terminal device adopts the same beam to send the multiple signals, the terminal device may adopt the same beam to transmit the multiple signals. The network device may adopt different beams to receive the multiple signals, and the network device may determine the beams adopted for the signal with the optimal receiving quality in the multiple signals, thereby determining the specific beams subsequently adopted to receive the signal with the optimal signal quality. It is to be understood that there may be one or more signals with the optimal receiving quality. There are no limits made thereto in the disclosure.

It is to be understood that the abovementioned embodiment is only a schematic description and should not limit the embodiment of the disclosure. For example, when the terminal device determines according to the beam indication information that the terminal device should send the multiple signals to the network device by using different beams, the terminal device may adopt different beams to send the multiple signals to the network device, and the terminal device may also adopt the same beam to send the multiple signals to the network device. The terminal device may determine the beam indication information as reference information and send or receive the multiple signals according to its own condition.

It is also to be understood that the N signals in the embodiment may not only include uplink signals but also include downlink signals. That is, the beam indication information may indicate that the same or different beams are adopted for the uplink signals in the N signals and may also indicate that the same or different beams are adopted for the downlink signals in the N signals. The embodiment of the disclosure is not limited to a scenario that the N signals only refer to uplink signals or downlink signals.

In at least one embodiment of the disclosure, the beam indication information is carried in at least one of the following signaling or signals: RRC signaling, MAC signaling, DCI signaling, a downlink synchronization signal, a downlink random access signal or a downlink pilot signal.

Specifically, the beam indication information is transmitted through the RRC signaling or the MAC signaling or the DCI signaling, or the beam indication information is carried in a downlink signal. For example, the beam indication information may be carried in a Primary Synchronization Signal (PSS) or a Secondary Synchronization Signal (SSS) or a PBCH. The beam indication information may also be implicitly indicated through other information in DCI. The beam indication information may further be sent to the terminal device together with transmission resource configuration information for the multiple signals. For example, when the transmission resource configuration information for the multiple signals is configured through RRC signaling, the beam indication information may be sent or received together with the transmission resource configuration information in the same RRC information field. A beam indication signal may also be carried through some dedicated downlink control signals.

Furthermore, the MAC signaling carrying the beam indication information is configured to activate or deactivate the N signals; and/or, when the N signals are reference signals, the DCI signaling carrying the beam indication information is configured to trigger the N signals, and when the N signals are channels, the DCI signaling carrying the beam indication information is configured to schedule the N signals. For example, when a CSI-RS resource is activated through the MAC signaling, the beam indication information may be carried through the MAC signaling.

In at least one embodiment, the DCI signaling triggering or scheduling the multiple signals and/or the MAC signaling activating or deactivating the multiple signals may also not carry the beam indication information. The beam indication information is carried in other signaling such as the RRC signaling. The embodiment of the disclosure is not limited thereto.

It is to be understood that when the beam indication information and the transmission resource configuration information corresponding to the multiple signals are transmitted together, the multiple signals may be the same type of signals with different transmission resource configurations or different types of signals with different transmission resource configurations. For example, the multiple signals are pilot signals of the same type or channels of the same type. For example, all of the multiple signals are PRACH signals, or SRSs, or DMRSs, or CSI-RSs, or BRSs, or synchronization signals, or Physical Downlink Shared Channel (PDSCH) signals, or PBCH signals, or Physical Uplink Shared Channel (PUSCH) signals.

In at least one embodiment of the disclosure, the beam indication information includes beam information in one-to-one correspondence with each signal in the N signals, and the beam indication information indicates whether the same beam is adopted for the N signals through at least one of the followings. When contents indicated by beam information for a first signal and a second signal in the N signals are the same, the same beam is adopted to transmit the first signal and the second signal; when contents indicated by beam information for a third signal and a fourth signal in the N signals are different, different beams are adopted to transmit the third signal and the fourth signal; when beam information for a fifth signal and a sixth signal in the N signals is a first preconfigured value (for example, the first value may be 0), the same beam is adopted to transmit the fifth signal and the sixth signal; when beam information for a seventh signal and an eighth signal in the N signals is a second preconfigured value (for example, the second value may be 1), different beams are adopted to transmit the seventh signal and the eighth signal, the first value being different from the second value; when a content indicated by beam information for a ninth signal in the N signals includes an index of a tenth signal in the N signals, the same beam is adopted to transmit the ninth signal and the tenth signal; or when a content indicated by the beam information for an eleventh signal in the N signals includes an index of a twelfth signal in the N signals, different beams are adopted to transmit the eleventh signal and the twelfth signal.

Specifically, the beam indication information may be a bit table. In the bit table, each bit corresponds to a signal in the multiple signals and each bit represents the beam information adopted for the signal. For example, eight bits are adopted to represent eight signals. It may be predetermined that the same beam is adopted for the signals corresponding to the bits 0 and different beams are adopted for the signals corresponding to the bits 1. It may also be predetermined that the same beam is adopted for the signals corresponding to the bits 1 and different beams are adopted for the signals corresponding to the bits 0. For another example, in the eight pieces of beam information included in the beam indication information, when a content indicated by a certain piece of beam information includes an index of another signal, it may be predetermined that the same beam is adopted for the two signals and it may also be predetermined that different beams are adopted for the two signals. It is to be understood that the above is only exemplary description and not intended to limit the scope of protection of the embodiment of the disclosure.

FIG. 4 is a schematic block diagram of a signal transmission method 200 according to an embodiment of the disclosure. The method 200 may be executed by a network device and, for example, may be executed by a base station. As illustrated in FIG. 4, the method 200 includes the following operations.

In S210, beam indication information is sent to a terminal device, the beam indication information being configured to indicate whether the same beam is adopted for transmission of N signals and N being an integer greater than 1.

In S220, transmission of the N signals is performed with the terminal device.

According to the signal transmission method of the embodiment of the disclosure, the network device sends the beam indication information used for determining whether the same beam is adopted for transmission of the multiple signals to the terminal device, so that the terminal device and the network device may determine respective optimal beams adopted for signal sending or signal receiving. Therefore, performance of subsequent signal detection is improved.

In at least one embodiment of the disclosure, the beam indication information is configured to indicate that a network device would send the N signals to the terminal device using different beams. The operation that transmission of the N signals is performed with the terminal device includes that: the N signals are sent by using different beams. The method further includes the following operation. First indication information sent by the terminal device is received, and the first indication information is configured to indicate K signals out of the N signals, 1≤K≤N and K being an integer.

Furthermore, after the network device adopts different beams to send the N signals, the method 200 further includes the following operation. A beam used for sending a subsequent signal is determined according to the first indication information.

In at least one embodiment of the disclosure, the beam indication information is configured to indicate the terminal device to send the N signals to the network device using different beams. The operation that transmission of the N signals is performed with the terminal device includes that the N signals are received by using the same beam. The method further includes the following operation. Second indication information is sent to the terminal device, and the second indication information is configured to indicate L signals out of the N signals, 1≤L≤N and L being an integer.

In at least one embodiment of the disclosure, the beam indication information is configured to indicate that the network device would send the N signals to the terminal device using the same beam. The operation that transmission of the N signals is performed with the terminal device includes that the N signals are sent by using the same beam.

In at least one embodiment of the disclosure, the beam indication information is configured to indicate the terminal device to send the N signals to the network device by using the same beam. The operation that transmission of the N signals is performed with the terminal device includes that the N signals are received by using different beams. The method further includes the following operation. A beam used for receiving a subsequent signal is determined from the beams for receiving the N signals.

In at least one embodiment of the disclosure, the N signals are the same type of reference signals with different transmission resource configurations or the same type of channels with different transmission resource configurations.

In at least one embodiment of the disclosure, the N signals are signals activated or deactivated by the same MAC signaling, or the N signals are reference signals triggered by the same DCI signaling, or the N signals are channels scheduled by the same DCI signaling.

In at least one embodiment of the disclosure, the beam indication information is carried in at least one of the following information: RRC signaling, MAC signaling, DCI signaling, a downlink synchronization signal, a downlink random access signal or a downlink pilot signal.

In at least one embodiment of the disclosure, the MAC signaling is configured to activate or deactivate the N signals; and/or, when the N signals are reference signals, the DCI signaling is configured to trigger the N signals, and when the N signals are channels, the DCI signaling is configured to schedule the N signals.

In at least one embodiment of the disclosure, the RRC signaling is further configured to carry transmission resource configuration information corresponding to the N signals. The operation that transmission of the N signals is performed with the terminal device includes that: transmission of the N signals is performed with the terminal device according to the transmission resource configuration information.

In at least one embodiment of the disclosure, the beam indication information is beam information in one-to-one correspondence with each signal in the N signals, and the beam indication information indicates whether the same beam is adopted for the N signals through at least one of the followings. When contents indicated by beam information for a first signal and a second signal in the N signals are the same, the same beam is adopted to transmit the first signal and the second signal; when contents indicated by beam information for a third signal and a fourth signal in the N signals are different, different beams are adopted to transmit the third signal and the fourth signal; when beam information for a fifth signal and a sixth signal in the N signals is a first preconfigured value, the same beam is adopted to transmit the fifth signal and the sixth signal; when beam information for a seventh signal and an eighth signal in the N signals is a second preconfigured value, different beams are adopted to transmit the seventh signal and the eighth signal, the first value being different from the second value; when a content indicated by beam information for a ninth signal in the N signals includes an index of a tenth signal in the N signals, the same beam is adopted to transmit the ninth signal and the tenth signal; or when a content indicated by beam information for an eleventh signal in the N signals includes an index of a twelfth signal in the N signals, different beams are adopted to transmit the eleventh signal and the twelfth signal.

In at least one embodiment of the disclosure, the N signals are at least one type of the following signals: CSI-RSs, SRSs, PRACHs, downlink synchronization signals, PBCHs, DMRSs or BRSs.

It is to be understood that interaction with the terminal device and related characteristics, functions and the like described in the signal transmission method for a network device side correspond to related characteristics and functions of the signal transmission method for a terminal device side and will not be elaborated herein for simplicity.

The technical solutions of the disclosure will be described below in combination with embodiment 1 to embodiment 5 in detail.

Embodiment 1: a network-side device configures N CSI-RS resources and allocates 3-bit beam indication information for each CSI-RS resource. The beam indication information is indicated together with resource configuration information of each CSI-RS resource. A terminal determines whether the same beam is adopted for CSI-RSs corresponding to different CSI-RS resources according to the beam indication information of each CSI-RS resource. Specifically, the same beam is adopted for the CSI-RSs corresponding to the CSI-RS resources configured with the same indication information and different beams are adopted for the CSI-RSs corresponding to the CSI-RS resources configured with different indication information. For example, when N=4, the beam indication information corresponding to a CSI-RS resource 0 and a CSI-RS resource 2 indicate 0, the beam indication information for a CSI-RS resource 1 indicates 1 and the beam indication information for a CSI-RS resource 3 indicates 2, it is indicated that the same beam (recorded as Beam 1) is used for transmitting the CSI-RSs corresponding to the resource 0 and the resource 2, a different beam (recorded as Beam 2) is used for transmitting the CSI-RS corresponding to the resource 1 and another different beam (recorded as Beam 3) is used for transmitting the CSI-RS corresponding to the resource 3. The CSI-RSs sent by the same beam may be configured for determining downlink receiving beams, and the CSI-RSs sent by different beams may be configured for determining downlink sending beams.

Embodiment 2: a network-side device configures N SRSs resources and allocates 1-bit beam indication information for each SRS resource. The beam indication information is indicated together with resource configuration information of each SRS resource. A terminal determines whether the same beam is adopted for different SRSs according to the beam indication information of each SRS resource. Specifically, the same beam is adopted for the SRSs corresponding to the SRS resources configured with indication information 0 and different beams are adopted for the SRSs corresponding to the SRS resources configured with indication information 1. For example, when N=8, the beam indication information corresponding to the SRS resources {0, 1, 2, 3} indicates 0 and the beam indication information corresponding to the SRS resources {4, 5, 6, 7} indicates 1, the same beam (recorded as Beam 1) is used for transmitting the SRSs corresponding to the SRS resources {0, 1, 2, 3} and different beams (recorded as Beam 2, Beam 3, Beam 4 and Beam 5) are used for transmitting the SRSs corresponding to the SRS resources {4, 5, 6, 7). The SRSs sent by the same beam may be configured for determining uplink receiving beams, and the SRSs sent by different beams may be configured for determining uplink sending beams. The same method may also be applied to PRACH transmission.

Embodiment 3: a network-side device configures N CSI-RS resources in advance through RRC signaling and triggers a terminal through downlink DCI to perform aperiodic CSI-RS measurement based on K CSI-RS resources in the N CSI-RS resources, K being an integer less than or equal to N. The DCI contains 1-bit beam indication information. When the indication information indicates 0, it is indicated that the same beam is used for transmitting CSI-RSs corresponding to the K triggered CSI-RS resources. When the indication information indicates 1, it is indicated that different beams are used for the CSI-RSs corresponding to the K triggered CSI-RS resources. The CSI-RSs sent by the same beam may be configured for determining downlink receiving beams and the CSI-RSs sent by different beams may be configured for determining downlink sending beams.

Embodiment 4: a network-side device triggers a terminal to perform aperiodic SRS transmission through DCI, and every time when the terminal is triggered, N SRSs are required to be repeatedly sent. For the N SRSs, the same frequency-domain resource/sequence may be adopted and different frequency-domain resources/sequences may also be adopted. The DCI contains 1-bit beam indication information. When the indication information indicates 0, it is indicated that the same beam is used for transmitting the N triggered SRSs. When the indication information indicates 1, it is indicated that different beams are used for the N triggered SRSs. The SRSs sent by the same beam may be configured for determining uplink receiving beams and the CSI-RSs sent by different beams may be configured for determining uplink sending beams.

Embodiment 5: during downlink synchronization signal transmission, beam indication information may be carried through a PSS sequence or an SSS sequence or a PRACH. A PSS is taken as an example herein. Different PSS sequences may be adopted to implicitly indicate the beam indication information. That is, different information corresponds to different PSS sequences. For example, information 0 corresponds to a PSS sequence 1 and information 1 corresponds to a PSS sequence 2. Such a correspondence may be predetermined. The terminal performs blind detection on the PSS sequences to obtain the information corresponding to each PSS sequence, and then determines whether the same beam is adopted for multiple PSS sequences according to the information. Two determination methods may specifically be adopted. The information 0 indicates that the same beam is used for transmitting a plurality of corresponding PSS sequences and the information 1 indicates that different beams are used for transmitting a plurality of corresponding PSS sequences. N different PSS sequences are used to correspond to N different beam indication information, the same beam is used for the PSS sequences with the same beam indication information and different beams are used for the PSS sequences with different beam indication information. For example, when the beam indication information is K, it is indicated that a Kth beam is used for transmitting a PSS sequence.

The signal transmission method according to the embodiments of the disclosure is described above in detail and a device for signal transmission according to the embodiments of the disclosure will be described below in combination with FIG. 5 to FIG. 8. The technical characteristics described in the method embodiments are applied to the following device embodiments.

FIG. 5 is a schematic block diagram of a terminal device 300 for signal transmission according to an embodiment of the disclosure. As illustrated in FIG. 5, the terminal device 300 includes a receiving unit 310 and a transmission unit 320.

The receiving unit 310 is configured to receive beam indication information sent by a network device. The beam indication information is configured to indicate whether the same beam is adopted for N signals to be sent or received and N is an integer greater than 1.

The transmission unit 320 is configured to perform transmission of the N signals with the network device according to the beam indication information.

In the embodiment of the disclosure, the terminal device 300 for signal transmission determines whether the same beam is adopted for transmission of the N signals according to the beam indication information and performs signal transmission based on the determination, so that the terminal device and the network device may determine respective optimal beams adopted for signal sending or signal receiving. Therefore, performance of subsequent signal detection is improved.

In at least one embodiment of the disclosure, the beam indication information is configured to indicate that the network device will send the N signals to the terminal device using different beams. The transmission unit 320 is specifically configured to receive the N signals according to the beam indication information.

The terminal device 300 further includes a sending unit 330.

The sending unit 330 is configured to send first indication information to the network device. The first indication information is configured to indicate K signals out of the N signals, 1≤K≤N and K being an integer.

In at least one embodiment of the disclosure, the beam indication information is configured to indicate the terminal device to send the N signals to the network device using different beams. The transmission unit 320 is specifically configured to send the N signals by using different beams according to the beam indication information.

The receiving unit 310 is further configured to receive second indication information sent by the network device. The second indication information is configured to indicate L signals out of the N signals, 1≤L≤N and L being an integer.

Furthermore, in the embodiment of the disclosure, the terminal device further includes a determination unit.

The determination unit is configured to determine a beam used for sending a subsequent signal according to the second indication information.

In at least one embodiment, of the disclosure, the beam indication information is configured to indicate that the network device would send the N signals to the terminal device using the same beam. The transmission unit 320 is specifically configured to receive the N signals by using different beams according to the beam indication information.

The determination unit 340 is further configured to determine a beam used for receiving the subsequent signal from the beams for receiving the N signals.

In at least one embodiment of the disclosure, the beam indication information is configured to indicate the terminal device to send the N signals to the network device using the same beam. The transmission unit 320 is specifically configured to send the N signals by using the same beam according to the beam indication information.

In at least one embodiment of the disclosure, the N signals are the same type of reference signals with different transmission resource configurations or the same type of channels with different transmission resource configurations.

In at least one embodiment of the disclosure, the N signals are signals activated or deactivated by the same MAC signaling, or the N signals are reference signals triggered by the same DCI signaling, or the N signals are channels scheduled by the same DCI signaling.

In at least one embodiment of the disclosure, the beam indication information is carried in at least one of the following signaling: RRC signaling, downlink MAC signaling, DCI signaling, a downlink synchronization signal, a downlink random access signal or a downlink pilot signal.

In at least one embodiment of the disclosure, the MAC signaling is configured to activate or deactivate the N signals; and/or, when the N signals are reference signals, the DCI signaling is configured to trigger the N signals, and when the N signals are channels, the DCI signaling is configured to schedule the N signals.

In at least one embodiment of the disclosure, the RRC signaling is further configured to carry transmission resource configuration information corresponding to the N signals. The transmission unit 320 is specifically configured to perform transmission of the N signals with the network device according to the beam indication information and the transmission resource configuration information.

In at least one embodiment of the disclosure, the beam indication information includes beam information in one-to-one correspondence with each signal in the N signals. The beam indication information indicates whether the same beam is adopted for the N signals through at least one of the followings. When contents indicated by the beam information for a first signal and a second signal in the N signals are the same, the same beam is adopted to transmit the first signal and the second signal; when contents indicated by the beam information for a third signal and a fourth signal in the N signals are different, different beams are adopted to transmit the third signal and the fourth signal; when the beam information for a fifth signal and a sixth signal in the N signals is a first preconfigured value, the same beam is adopted to transmit the fifth signal and the sixth signal; when the beam information for a seventh signal and an eighth signal in the N signals is a second preconfigured value, different beams are adopted to transmit the seventh signal and the eighth signal, the first value being different from the second value; when a content indicated by the beam information for a ninth signal in the N signals includes an index of a tenth signal in the N signals, the same beam is adopted to transmit the ninth signal and the tenth signal; or when a content indicated by the beam information for an eleventh signal in the N signals includes an index of a twelfth signal in the N signals, different beams are adopted to transmit the eleventh signal and the twelfth signal.

In at least one embodiment of the disclosure, the N signals are at least one type of the following signals: CSI-RSs, SRSs, PRACHs, synchronization signals, PBCHs, DMRSs or BRSs.

It is to be understood that the terminal device 300 for signal transmission according to the embodiment of the disclosure may correspond to the terminal device in the method embodiments of the disclosure, and the abovementioned and other operations and/or functions of each unit in the terminal device 300 are adopted to implement the corresponding flows of the method in FIG. 3, which will not be elaborated herein for simplicity.

FIG. 6 is a schematic block diagram of a network device 400 for signal transmission according to an embodiment of the disclosure. As illustrated in FIG. 6, the network device 400 includes a sending unit 410 and a transmission unit 420.

The sending unit 410 is configured to send beam indication information to a terminal device. The beam indication information is configured to indicate whether the same beam is adopted for N signals to be sent or received and N is an integer greater than 1.

The transmission unit 420 is configured to perform transmission of the N signals with the terminal device.

According to the embodiment of the disclosure, the network device for signal transmission sends the beam indication information used for determining whether the same beam is adopted for transmission of the multiple signals to the terminal device, so that the terminal device and the network device may determine respective optimal beams adopted for signal sending or signal receiving. Therefore, performance of subsequent signal detection is improved.

In at least one embodiment of the disclosure, the beam indication information is configured to indicate that the network device would send the N signals to the terminal device using different beams.

The transmission unit 420 is specifically configured to send the N signals by using different beams.

The network device 400 further includes a receiving unit 430.

The receiving unit 430 is configured to receive first indication information sent by the terminal device. The first indication information is configured to indicate K signals out of the N signals, 1≤K≤N and K being an integer.

Furthermore, the network device 400 further includes a determination unit 440.

The determination unit 440 is configured to determine a beam used for sending a subsequent signal according to the first indication information.

In at least one embodiment of the disclosure, the beam indication information is configured to indicate the terminal device to send the N signals to the network device using different beams. The transmission unit 420 is specifically configured to receive the N signals by using the same beam.

The sending unit 410 is further configured to send second indication information to the terminal device. The second indication information is configured to indicate L signals out of the N signals, 1≤L≤N and L being an integer.

In at least one embodiment of the disclosure, the beam indication information is configured to indicate that the network device would send the N signals to the terminal device using the same beam.

The transmission unit 420 is specifically configured to send the N signals using the same beam.

In at least one embodiment of the disclosure, the beam indication information is configured to indicate the terminal device to send the N signals to the network device using the same beam.

The transmission unit 420 is specifically configured to receive the N signals using different beams.

The determination unit 440 is further configured to determine a beam used for receiving the subsequent signal from the beams for receiving the N signals.

In at least one embodiment of the disclosure, the N signals are the same type of reference signals with different transmission resource configurations or the same type of channels with different transmission resource configurations.

In at least one embodiment of the disclosure, the N signals are signals activated or deactivated by the same MAC signaling, or the N signals are reference signals triggered by the same DCI signaling, or the N signals are channels scheduled by the same DCI signaling.

In at least one embodiment of the disclosure, the beam indication information is carried in at least one of the following information: RRC signaling, MAC signaling, DCI signaling, a downlink synchronization signal, a downlink random access signal or a downlink pilot signal.

In at least one embodiment of the disclosure, the MAC signaling is configured to activate or deactivate the N signals; and/or, when the N signals are reference signals, the DCI signaling is configured to trigger the N signals, and when the N signals are channels, the DCI signaling is configured to schedule the N signals.

In at least one embodiment of the disclosure, the RRC signaling is further configured to carry transmission resource configuration information corresponding to the N signals. The operation that transmission of the N signals is performed with the terminal device includes that: transmission of the N signals is performed with the terminal device according to the transmission resource configuration information.

In at least one embodiment of the disclosure, the beam indication information is beam information in one-to-one correspondence with each signal in the N signals. The beam indication information indicates whether the same beam is adopted for the N signals through at least one of the followings. When contents indicated by the beam information for a first signal and a second signal in the N signals are the same, the same beam is adopted to transmit the first signal and the second signal; when contents indicated by the beam information for a third signal and a fourth signal in the N signals are different, different beams are adopted to transmit the third signal and the fourth signal; when the beam information for a fifth signal and a sixth signal in the N signals is a first preconfigured value, the same beam is adopted to transmit the fifth signal and the sixth signal; when the beam information for a seventh signal and an eighth signal in the N signals is a second preconfigured value, different beams are adopted to transmit the seventh signal and the eighth signal, the first value being different from the second value; when a content indicated by the beam information for a ninth signal in the N signals includes an index of a tenth signal in the N signals, the same beam is adopted to transmit the ninth signal and the tenth signal; or when a content indicated by the beam information for an eleventh signal in the N signals includes an index of a twelfth signal in the N signals, different beams are adopted to transmit the eleventh signal and the twelfth signal.

In at least one embodiment of the disclosure, the N signals are at least one type of the following signals: CSI-RSs, SRSs, PRACHs, downlink synchronization signals, PBCHs, DMRSs or BRSs.

It is to be understood that the network device 400 for signal transmission according to the embodiment of the disclosure may correspond to the network device in the method embodiments of the disclosure, and the abovementioned and other operations and/or functions of each unit in the network device 400 are used to implement the corresponding flows of the methods in FIG. 4 respectively, which will not be elaborated herein for simplicity.

Figure 7:
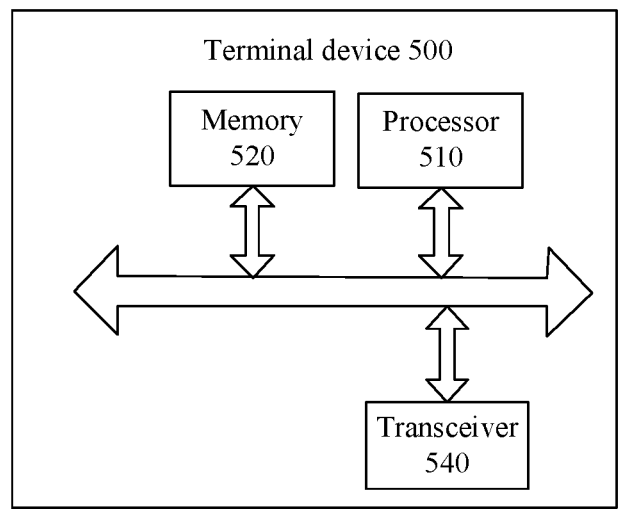
FIG. 7 is another schematic block diagram of a terminal device for signal transmission according to an embodiment of the disclosure.

As illustrated in FIG. 7, an embodiment of the disclosure also provides a terminal device 500 for signal transmission, which includes a processor 510, a memory 520 and a transceiver 540. The processor 510, the memory 520 and the transceiver 540 communicate with each other through an internal connecting path to transmit control and/or data signals. The memory 520 is configured to store an instruction. The processor 510 is configured to execute the instruction stored in the memory 520 to control the transceiver 540 to send a signal. The processor 510 is configured to receive beam indication information sent by a network device, the beam indication information being configured to indicate whether the same beam is adopted for N signals to be sent or received, N being an integer greater than 1, and perform transmission of the N signals with the network device according to the beam indication information.

According to the embodiment of the disclosure, the terminal device for signal transmission determines whether the same beam is adopted for transmission of the N signals according to the beam indication information and performs signal transmission based on the determination, so that the terminal device and the network device may determine respective optimal beams adopted for signal sending or signal receiving. Therefore, performance of subsequent signal detection is improved.

It is to be understood that, in the embodiment of the disclosure, the processor 510 may be a Central Processing Unit (CPU) and the processor 510 may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 520 may include a Read-Only Memory (ROM) and a Random Access Memory (RAM) and provides an instruction and data for the processor 510. A part of the memory 520 may further include a nonvolatile RAM. For example, the memory 520 may further store information of a device type.

In an implementation process, each operation of the method may be completed by an integrated logic circuit of hardware in the processor 510 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 520. The processor 510 reads information in the memory 520 and completes the operations of the method in combination with hardware. No more detailed descriptions will be made herein to avoid repetitions.

In at least one embodiment of the disclosure, the beam indication information is configured to indicate that the network device would send the N signals to the terminal device using different beams. The processor 510 is specifically configured to receive the N signals by using the same beam according to the beam indication information. The processor 510 is further configured to send first indication information to the network device, the first indication information being configured to indicate K signals out of the N signals, $1 \leq K \leq N$ and K being an integer.

In at least one embodiment of the disclosure, the beam indication information is configured to indicate the terminal device to send the N signals to the network device using different beams. The processor 510 is specifically configured to send the N signals by using different beams according to the beam indication information. The processor 510 is further configured to receive second indication information sent by the network device, the second indication information being configured to indicate L signals out of the N signals, $1 \leq L \leq N$ and L being an integer.

Furthermore, in the embodiment of the disclosure, the processor 510 is further configured to determine a beam used for sending a subsequent signal according to the second indication information.

In at least one embodiment of the disclosure, the beam indication information is configured to indicate that the network device would send the N signals to the terminal device using the same beam. The processor 510 is specifically configured to receive the N signals by using different beams according to the beam indication information. The processor 510 is further configured to determine a beam used for receiving a subsequent signal from the beams for receiving the N signals.

In at least one embodiment of the disclosure, the beam indication information is configured to indicate the terminal device to send the N signals to the network device using the same beam. The processor 510 is specifically configured to send the N signals by using the same beam according to the beam indication information.

In at least one embodiment of the disclosure, the N signals are the same type of reference signals with different transmission resource configurations or the same type of channels with different transmission resource configurations.

In at least one embodiment of the disclosure, the N signals are signals activated or deactivated by the same MAC signaling, or the N signals are reference signals triggered by the same DCI signaling, or the N signals are channels scheduled by the same DCI signaling.

In at least one embodiment of the disclosure, the beam indication information is carried in at least one of the following signaling or signals: RRC signaling, downlink MAC signaling, DCI signaling, a downlink synchronization signal, a downlink random access signal or a downlink pilot signal.

In at least one embodiment of the disclosure, the MAC signaling is configured to activate or deactivate the N signals; and/or, when the N signals are reference signals, the DCI signaling is configured to trigger the N signals, and when the N signals are channels, the DCI signaling is configured to schedule the N signals.

In at least one embodiment of the disclosure, the RRC signaling is further configured to carry transmission resource configuration information corresponding to the N signals. The operation that transmission of the N signals is performed with the network device according to the beam indication information includes that: transmission of the N signals is performed with the network device according to the beam indication information and the transmission resource configuration information.

In at least one embodiment of the disclosure, the beam indication information includes beam information in one-to-one correspondence with each signal in the N signals. The beam indication information indicates whether the same beam is adopted for the N signals through at least one of the followings. When contents indicated by the beam information for a first signal and a second signal in the N signals are the same, the same beam is adopted to transmit the first signal and the second signal; when contents indicated by the beam information for a third signal and a fourth signal in the N signals are different, different beams are adopted to transmit the third signal and the fourth signal; when the beam information for a fifth signal and a sixth signal in the N signals is a first preconfigured value, the same beam is adopted to transmit the fifth signal and the sixth signal; when the beam information for a seventh signal and an eighth signal in the N signals is a second preconfigured value, different beams are adopted to transmit the seventh signal and the eighth signal, the first value being different from the second value; when a content indicated by the beam information for a ninth signal in the N signals includes an index of a tenth signal in the N signals, the same beam is adopted to transmit the ninth signal and the tenth signal; or when a content indicated by the beam information for an eleventh signal in the N signals includes an index of a twelfth signal in the N signals, different beams are adopted to transmit the eleventh signal and the twelfth signal.

In at least one embodiment of the disclosure, the N signals are at least one type of the following signals: CSI-RSs, SRSs, PRACHs, synchronization signals, PBCHs, DMRSs or BRSs.

It is to be understood that the terminal device 500 for signal transmission according to the embodiment of the disclosure may correspond to the terminal device and terminal device 300 in the embodiments of the disclosure and may correspond to the terminal device executing the methods according to the embodiments of the disclosure, and the abovementioned and other operations and/or functions of each unit in the terminal device 500 are used to implement the corresponding flows of the methods in FIG. 3 respectively, which will not be elaborated herein for simplicity.

Figure 8:
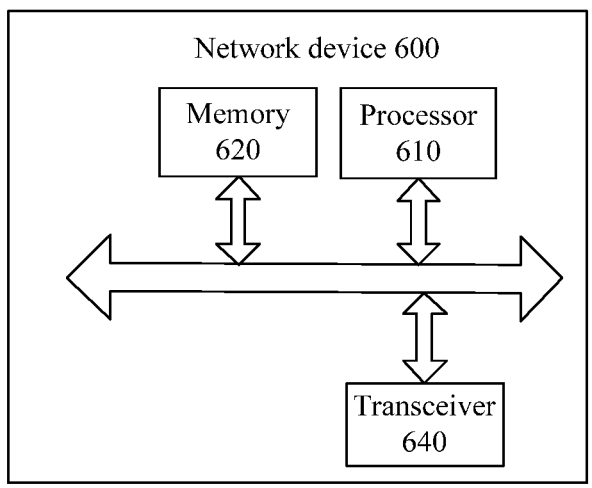
FIG. 8 is another schematic block diagram of a network device for signal transmission according to an embodiment of the disclosure.

As illustrated in FIG. 8, an embodiment of the disclosure also provides a network device 600 for signal transmission, which includes a processor 610, a memory 620 and a transceiver 640. The processor 610, the memory 620 and the transceiver 640 communicate with each other through an internal connecting path to transmit control and/or data signals. The memory 620 is configured to store an instruction. The processor 650 is configured to execute the instruction stored in the memory 620 to control the transceiver 640 to send a signal. The processor 610 is configured to send beam indication information to a terminal device, the beam indication information being configured to indicate whether the same beam is adopted for N signals to be sent or received, N being an integer greater than 1, and perform transmission of the N signals with the terminal device.

According to the embodiment of the disclosure, the network device for signal transmission sends the beam indication information used for determining whether the same beam is adopted for transmission of the N signals to the terminal device, so that the terminal device and the network device may determine respective optimal beams adopted for signal sending or signal receiving. Therefore, performance of subsequent signal detection is improved.

It is to be understood that in the embodiment of the disclosure, the processor 610 may be a CPU and the processor 610 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 620 may include a ROM and a RAM, and provides an instruction and data for the processor 610. A part of the memory 620 may further include a nonvolatile RAM. For example, the memory 620 may further store information of a device type.

In an implementation process, each operation of the method may be completed by an integrated logic circuit of hardware in the processor 610 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 620. The processor 610 reads information in the memory 620 and completes the operations of the method in combination with hardware. No more detailed descriptions will be made herein to avoid repetitions.

In at least one embodiment of the disclosure, the beam indication information is configured to indicate that the network device would send the N signals to the terminal device using different beams. The processor 610 is specifically configured to send the N signals by using different beams. The processor 610 is further configured to receive first indication information sent by the terminal device, the first indication information being configured to indicate K signals out of the N signals, 1≤K≤N and K being an integer.

Furthermore, in the embodiment of the disclosure, the processor 610 is further configured to determine a beam used for sending a subsequent signal according to the first indication information.

In at least one embodiment of the disclosure, the beam indication information is configured to indicate the terminal device to send the N signals to the network device using different beams. The processor 610 is specifically configured to receive the N signals by using the same beam. The processor 610 is further configured to send second indication information to the terminal device, the second indication information being configured to indicate L signals out of the N signals, 1≤L≤N and L being an integer.

In at least one embodiment of the disclosure, the beam indication information is configured to indicate that the network device would send the N signals to the terminal device using the same beam. The processor 610 is specifically configured to send the N signals by using the same beam.

In at least one embodiment of the disclosure, the beam indication information is configured to indicate the terminal device to send the N signals to the network device using the same beam. The processor 610 is specifically configured to receive the N signals by using different beams. The processor 610 is further configured to determine a beam used for receiving a subsequent signal from the beams for receiving the N signals.

In at least one embodiment of the disclosure, the N signals are the same type of reference signals with different transmission resource configurations or the same type of channels with different transmission resource configurations.

In at least one embodiment of the disclosure, the N signals are signals activated or deactivated by the same MAC signaling, or the N signals are reference signals triggered by the same DCI signaling, or the N signals are channels scheduled by the same DCI signaling.

In at least one embodiment of the disclosure, the beam indication information is carried in at least one of the following signaling or signals: RRC signaling, MAC signaling, DCI signaling, a downlink synchronization signal, a downlink random access signal or a downlink pilot signal.

In at least one embodiment of the disclosure, the MAC signaling is configured to activate or deactivate the N signals; and/or, when the N signals are reference signals, the DCI signaling is configured to trigger the N signals, and when the N signals are channels, the DCI signaling is configured to schedule the N signals.

In at least one embodiment of the disclosure, the RRC signaling is further configured to carry transmission resource configuration information corresponding to the N signal. The operation that transmission of the N signals is performed with the terminal device includes that: transmission of the N signals is performed with the terminal device according to the transmission resource configuration information.

In at least one embodiment of the disclosure, the beam indication information is beam information in one-to-one correspondence with each signal in the N signals. The beam indication information indicates whether the same beam is adopted for the N signals through at least one of the followings. When contents indicated by the beam information for a first signal and a second signal in the N signals are the same, the same beam is adopted to transmit the first signal and the second signal; when contents indicated by the beam information for a third signal and a fourth signal in the N signals are different, different beams are adopted to transmit the third signal and the fourth signal; when the beam information for a fifth signal and a sixth signal in the N signals is a first preconfigured value, the same beam is adopted to transmit the fifth signal and the sixth signal; when the beam information for a seventh signal and an eighth signal in the N signals is a second preconfigured value, different beams are adopted to transmit the seventh signal and the eighth signal, the first value being different from the second value; when a content indicated by the beam information for a ninth signal in the N signals includes an index of a tenth signal in the N signals, the same beam is adopted to transmit the ninth signal and the tenth signal; or when a content indicated by the beam information for an eleventh signal in the N signals includes an index of a twelfth signal in the N signals, different beams are adopted to transmit the eleventh signal and the twelfth signal.

In at least one embodiment of the disclosure, the N signals are at least one type of the following signals: CSI-RSs, SRSs, PRACHs, downlink synchronization signals, PBCHs, DMRSs or BRSs.

It is to be understood that the network device 600 for data transmission according to the embodiment of the disclosure may correspond to the network device and network device 400 in the embodiments of the disclosure and may correspond to the network device executing the methods according to the embodiments of the disclosure, and the abovementioned and other operations and/or functions of each unit in the network device 600 are adopted to implement the corresponding flows of the methods in FIG. 4 respectively, which will not be elaborated herein for simplicity.

It is to be understood that the operations and/or functions of each unit in the network device provided in the embodiment of the disclosure correspond to the network device in the method side and interaction with the terminal device, the related characteristics, functions and the like correspond to the related characteristics and functions of the terminal device side and will not be elaborated herein for simplicity.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm operations of each example described in combination with the embodiments disclosed in the disclosure may be implemented by electronic hardware, computer software or a combination of the two. For clearly describing exchangeability of hardware and software, the compositions and operations of each example have been generally described in the foregoing descriptions according to functions. Whether these functions are executed in a hardware or software manner depends on specific applications and design constraints of the technical solutions. Professionals may realize the described functions for each specific application by use of different methods, but such realization shall fall within the scope of the embodiments of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system. In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Various equivalent modifications or replacements are apparent to those skilled in the art within the technical scope disclosed by the disclosure.

The invention claimed is:

1. A signal transmission method, comprising:
receiving, by a terminal device, beam indication information sent by a network device through Downlink Control Information (DCI) signaling, wherein the beam indication information indicates whether or not a same beam is adopted for sending N Channel State Information-Reference Signals (CSI-RSs) on N CSI-RS resources from the network device, and N is an integer greater than 1, wherein the beam indication information is 1-bit information; and
receiving, by the terminal device, according to the beam indication information, the N CSI-RSs sent on the N CSI-RS resources from the network device;
wherein the beam indication information indicates that the N CSI-RSs are sent to the terminal device using at least two different beams, and the method further comprises:
sending, by the terminal device, first indication information to the network device, the first indication information indicating K signals out of the N CSI-RSs, wherein 1≤K<N, and K being an integer.

2. The method of claim 1, wherein the N CSI-RSs are a same type of reference signals with different transmission resource configurations.

3. The method of claim 1, wherein the N CSI-RSs are reference signals triggered by a same DCI signaling.

4. The method of claim 1, wherein the beam indication information comprises beam information in one-to-one correspondence with each signal in the N CSI-RSs, and the beam indication information indicates whether the same beam is adopted for the N CSI-RSs through at least one of the followings:
responsive to determining that contents indicated by beam information for a first signal and a second signal in the N CSI-RSs are the same, the same beam is adopted to transmit the first signal and the second signal;
responsive to determining that contents indicated by beam information for a third signal and a fourth signal in the N CSI-RSs are different, different beams are adopted to transmit the third signal and the fourth signal;
responsive to determining that beam information for a fifth signal and a sixth signal in the N CSI-RSs is a first preconfigured value, the same beam is adopted to transmit the fifth signal and the sixth signal;
responsive to determining that beam information for a seventh signal and an eighth signal in the N CSI-RSs is a second preconfigured value, different beams are adopted to transmit the seventh signal and the eighth signal, the first preconfigured value being different from the second preconfigured value;

responsive to determining that a content indicated by beam information for a ninth signal in the N CSI-RSs comprises an index of a tenth signal in the N CSI-RSs, the same beam is adopted to transmit the ninth signal and the tenth signal; or responsive to determining that a content indicated by beam information for an eleventh signal in the N CSI-RSs comprises an index of a twelfth signal in the N CSI-RSs, different beams are adopted to transmit the eleventh signal and the twelfth signal.

5. A terminal device for signal transmission, comprising:
a memory and a processor,
the memory storing one or more computer programs that, when executed by the processor, cause the processor to execute operations comprising:
receiving beam indication information sent by a network device through Downlink Control Information (DCI) signaling, wherein the beam indication information indicates whether or not a same beam is adopted for sending N Channel State Information-Reference Signals (CSI-RSs) on N CSI-RS resources from the network device, and N is an integer greater than 1, wherein the beam indication information is 1-bit information; and
receiving according to the beam indication information, the N CSI-RSs sent on the CSI-RS resource from the network device;
wherein the beam indication information indicates that the N CSI-RSs are sent to the terminal device using at least two different beams, and the operations further comprise:
sending first indication information to the network device, the first indication information indicating K signals out of the N CSI-RSs, 1≤K<N, and K being an integer.

6. The terminal device of claim 5, wherein the N CSI-RSs are a same type of reference signals with different transmission resource configurations.

7. The terminal device of claim 5, wherein the N CSI-RSs are reference signals triggered by a same DCI signaling.

8. The terminal device of claim 5, wherein the beam indication information comprises beam information in one-to-one correspondence with: each signal in the N CSI-RSs, and the beam indication information indicates whether the same beam is adopted for the N CSI-RSs through at least one of the followings:
responsive to determining that contents indicated by beam information for a first signal and a second signal in the N CSI-RSs are the same, the same beam is adopted to transmit the first signal and the second signal;
responsive to determining that contents indicated by beam information for a third signal and a fourth signal in the N CSI-RSs are different, different beams are adopted to transmit the third signal and the fourth signal;
responsive to determining that beam information for a fifth signal and a sixth signal in the N CSI-RSs is a first preconfigured value, the same beam is adopted to transmit the fifth signal and the sixth signal;
responsive to determining that beam information for a seventh signal and an eighth signal in the N CSI-RSs is a second preconfigured value, different beams are adopted to transmit the seventh signal and the eighth signal, the first preconfigured value being different from the second preconfigured value;
responsive to determining that a content indicated by beam information for a ninth signal in the N CSI-RSs comprises an index of a tenth signal in the N CSI-RSs, the same beam is adopted to transmit the ninth signal and the tenth signal; and
responsive to determining that a content indicated by beam information for an eleventh signal in the N CSI-RSs comprises an index of a twelfth signal in the N CSI-RSs, different beams are adopted to transmit the eleventh signal and the twelfth signal.

9. A network device for signal transmission, comprising:
a memory and a processor,
the memory storing one or more computer programs that, when executed by the processor, cause the processor to execute operations comprising:
sending beam indication information to a terminal device through Downlink Control Information (DCI) signaling, wherein the beam indication information indicates whether or not a same beam is adopted for sending N Channel State Information-Reference Signals (CSI-RSs) on N CSI-RS resources from the network device, and N is an integer greater than 1, wherein the beam indication information is 1-bit information; and
sending the N CSI-RSs on the N CSI-RS resources to the terminal device;
wherein the beam indication information indicates that the N CSI-RSs are sent to the terminal device using at least two different beams; and sending the N CSI-RSs on the N CSI-RS resources to the terminal device comprises:
sending the N CSI-RSs by using the at least two different beams;
and the method further comprises:
receiving first indication information sent by the terminal device, the first indication information indicates K signals out of the N CSI-RSs, wherein 1≤K<N and K being an integer.

10. The network device of claim 9, wherein the operations further comprise:
determining a beam from the at least two beams for sending subsequent signals according to the first indication information.

* * * * *